United States Patent [19]

Dines

[11] 4,337,225

[45] Jun. 29, 1982

[54] REGENERATION OF LIQUID MEMBRANE WITHOUT BREAKING EMULSION

[75] Inventor: Martin B. Dines, Santa Ana, Calif.

[73] Assignee: Occidental Research Corporation, Irvine, Calif.

[21] Appl. No.: 113,852

[22] Filed: Jan. 21, 1980

[51] Int. Cl.$^3$ .............................................. C01G 43/00
[52] U.S. Cl. ..................................... 423/10; 210/638; 423/3; 423/8
[58] Field of Search ................. 204/157.1 R; 210/638, 210/644, 648, 649, 651, 663, 682, 757, 766, 912; 252/316; 423/3, 8, 10

[56] References Cited

U.S. PATENT DOCUMENTS

| | | | |
|---|---|---|---|
| 3,711,591 | 1/1973 | Hurst et al. | 423/10 |
| 3,737,513 | 6/1973 | Wiewiorowski et al. | 423/8 |
| 3,779,907 | 12/1973 | Li et al. | 210/638 |
| 4,131,527 | 12/1978 | Friedman et al. | 204/157.1 R |

Primary Examiner—Ivars C. Cintins
Attorney, Agent, or Firm—Christie, Parker & Hale

[57] ABSTRACT

A process for removing a species from a fluid which comprises (a) contacting said fluid with an emulsion, said emulsion having an external phase and an internal phase, said external phase being immiscible with said fluid and said species being permeable to said external phase; (b) permeating said species through said external phase into said internal phase; (c) converting said permeated species in said internal phase, into a species which is impermeable to said external phase; (d) separating said emulsion from said fluid; (e) converting the impermeable species of step (c) into a species which is permeable to said external phase by means of an oxidation-reduction reaction; and (f) permeating the permeable species of step (e) through said external phase. The instant process may be carried out in the reverse manner, i.e. the fluid including the species to be removed can be the internal phase of an emulsion or foam and thus permeate through the external phase. Preferably the fluid is an aqueous solution and the emulsion is a water-in-oil emulsion. The impermeable species of step (c) may be converted into a species which is permeable to said external phase by irradiating with light (UV or visible), by heating or by isolating said impermeable species from light. Preferably the permeable species in the internal phase is $U^{+6}$ e.g. as $UO_2^{+2}$, which is trapped in the internal phase of the emulsion by reduction to $U^{+4}$ an impermeable species, in the presence of a hydroquinone and light. Simultaneously hydroquinone is converted to quinone. After separation of the emulsion containing uranium in the +4 nonpermeable state from the aqueous solution, the emulsion is subjected to agitation in the presence of a fresh aqueous solution and in the absence of light whereby the quinone oxidizes the $U^{+4}$ to $U^{+6}$ e.g. $UO_2^{+2}$ which then permeates through said external phase into said fresh aqueous solution.

29 Claims, No Drawings

REGENERATION OF LIQUID MEMBRANE WITHOUT BREAKING EMULSION

BACKGROUND OF THE INVENTION

1. Field of the Invention

The instant invention relates to the regeneration of "spent" emulsions which are useful in liquid membrane separation processes. Regeneration is carried out by converting an impermeable species which is trapped in the internal phase of said emulsion into a permeable species by means of oxidation-reduction reaction which may be initiated by heat, light, or the absence of light. During such conversion, the emulsion is preferably agitated with a solvent which is immiscible with the external phase of the emulsion but miscible with said permeable species at conditions wherein the emulsion is not broken, i.e. the integrity of the external phase is maintained.

2. Description of the Prior Art

There has emerged a new field of technology involving liquid membrane extraction. Broadly, the principle involves surrounding either a fluid phase from which a species is to be extracted or a fluid phase in which a species is to be collected by a liquid membrane which is immiscible therewith. The surrounded fluid phase is the internal phase, of an emulsion or foam while the liquid membrane is the external phase. During the liquid membrane process, the emulsion or foam, i.e. the internal phase surrounded by the external phase, is contacted with another fluid from which or to which species permeate through the liquid membrane. Generally, both the fluid to be extracted and the fluid which is used to collect the species extracted from said fluid are liquids. The liquid membrane extraction process thus requires dispersing an emulsion as droplets in a liquid which is immiscible with the external phase of said emulsion at conditions wherein species in the internal phase of said emulsion may permeate through said external phase into said liquid or vice-versa without disruption of the liquid membrane. That is, the emulsion must be stable.

In an improvement of the liquid membrane process, the species is chemically converted to a nonpermeable species after it permeates the liquid membrane and is thus "trapped" in the phase to which it has permeated. Trapping promotes diffusion or transport through the liquid membrane and thus enables higher levels of extraction to occur.

In this improvement, the external phase (or liquid membrane) serves as an intermediary acting in the same way as an immiscible liquid in liquid-liquid extraction, except that it is constantly stripped of the species which it extracts.

Illustrative of the patents which have been issued in the field of development and application of liquid membrane technology include U.S. Pat. Nos. 3,389,078; 3,410,794; 3,617,546; 3,637,488; 3,650,091; 3,696,028; 3,719,590; 3,773,776; 3,740,315; 3,740,329; 3,779,907; 3,897,398; 3,942,527 and 3,969,265 and reissues thereof, each incorporated herein by reference.

It is appreciated by those skilled in the art that the external phase to function as a liquid membrane must maintain its integrity. The formulation of emulsions and foams wherein the external phase will not rupture during dispersion in said liquid or gas is discussed in many of the above patents.

However, later issued patents have shown some concern with breaking the emulsions used in the liquid membrane process so that the internal phase of such emulsions can be recovered and used in formulating fresh emulsion. (See for example U.S. Pat. No. 4,001,109.) In certain liquid membrane patents, the internal phase can be regenerated by heating with super heated steam to convert an impermeable species to a permeable species which is then re-extracted into a fresh solution. (See, for example, U.S. Pat. No. 4,029,744). In this process the impermeable species is the salt formed by the combination of a weak acid and a weak base which salt decomposes upon heating to regenerate the weak acid and the weak base in a non-combined state. This reaction is not an oxidation-reduction reaction as claimed for the instant process. Moreover, many emulsions are known to be generally unstable to heat of this nature, therefore this technique is not generally applicable to regenerating liquid membrane emulsions. The need to break the emulsion and regenerate and re-emulsify the internal phase for reuse are overcome by the process of the instant invention. Moreover regeneration without extensive heating of the emulsion is possible in one preferred embodiment of the instant invention described below.

It should also be noted that it is known in the art that reversible oxidation-reduction reactions may be induced by light and that such reactions may be carried out in the presence of artificial membranes, micelles, or oil-in-water microemulsions to inhibit back-reaction. See for example *JACS*, 100:20, Sept. 27, 1978, by Kiwi and Gratzel, at pp. 6314–6320, and the references cited therein. This reference does not suggest the use of "liquid membrane" processes in conjunction with light induced, reversible oxidation-reduction reactions, as disclosed and claimed herein. (See also 280 *Nature* pp. 823–8224, Aug. 30, 1979).

SUMMARY OF THE INVENTION

The instant invention relates to a process for removing a species from a fluid which comprises (a) contacting said fluid with an emulsion or foam having an external phase and an internal phase, said external phase being immiscible with said fluid and said species being permeable to said external phase; (b) permeating said species through said external phase into said internal phase; (c) converting said permeated species, in said internal phase, into a species which is impermeable to said external phase; (d) separating said emulsion or foam from said fluid; (e) converting the impermeable species of step (c) into a species which is permeable to said external phase by means of an oxidation-reduction reaction; and (f) permeating the permeable species of step (e) through said external phase. The oxidation reduction reaction is preferably initiated by heat, light, or the absence of light.

The instant process is especially preferred for removing dissolved species from aqueous solutions by contacting said aqueous solution with an emulsion. Therefore, preferably the fluid to be treated by the process of this invention is an aqueous solution. In order to provide an emulsion which is immiscible with an aqueous solution, the external phase of such emulsion must be "oil" in nature as the term "oil" is known in the emulsion art. Therefore, preferably the emulsion is a water-in-oil emulsion.

The process of the instant invention is primarily directed towards the removal of ions which can exist in two oxidation states from solutions. More particularly such ions will exhibit a different affinity for some complexing or solvating agent depending on the oxidation state of the ion. Thus in the presence of or absence of an external electromagnetic field, e.g. heat or light, there will be a different distribution of ions existing in the two oxidation states. This may be demonstrated as follows. For example, for the electron transfer reaction:

$$O + R \rightleftarrows O^- + R^+$$

wherein O=oxidant, R=reductant, and $$K_{eq} = \frac{[O^-][R^+]}{[O][R]} = \exp\frac{(-nFE)}{RT}$$

(E=being the potential of redox reaction, F being Faraday's constant, n being number electrons transferred, R being Rydberg's constant, and T being the temperature in degrees centigrade.)

K will be dependent on the presence and strength of external radiation. Thus the ratio of $$\frac{[O^-]}{[O]} \text{ and } \frac{[R^+]}{[R]}$$

will also depend on the radiation.

Either O or R can be a metal ion having more than one oxidation state.

An illustrative example is the case of uranium ions; however it is to be understood that other ions may be subjected to the process of the instant invention. Depending on the redox potential of the solution, uranium may exist in solution as either $U^{+4}$ or $UO_2^{+2}$ (also described herein as the $U^{+6}$ valence state). The redox potential of uranium in solution can be chemically controlled by other species in the solution such as $I^-/I_2$, quinone/hydroquinone, or $Fe^{+2}/Fe^{+3}$ which together with such uranium ions comprise well known oxidation-reduction couples. Furthermore there are known complexing agents which are quite selective for one or the other valence state of uranium. For example, octylphenyl phosphoric acid (OPPA) extracts $U^{+4}$ selectively; while a mixture of diethyl hexyl phosphoric acid and trioctyl phosphine oxide (DEPHA-TOPO) prefers $U^{+6}$. In the presence of an external field presented by light flux, one can change the effective redox potential and thus the ratio of $U^{+4}$ to $U^{+6}$.

In actuality, since the photo reduction (or photo oxidation) is wavelength dependent, the presence or absence of the appropriate wavelength (or frequency) is critical. Thus, rather than the process operating with or without white light, it may be more meaningful to indicate the presence or absence of the resonant frequency of light. For instance, in the case of uranium, the $UO_2^{+2}$ group absorbs light at about 4200 Å wavelength, and $U^{+4}$ absorbs at about 6100 Å.

The $UO_2^{+2}$ ion is photoactive and is reduced to $U^{+4}$ in the presence of many oxidants (see "The Photochemistry of the Uranyl Ion", H. D. Burrows and T. J. Kemp, Chem. Soc. Rev., 3, 139 (1974) and "Spectroscopy and Photochemistry of Uranyl Compounds", by E. Rabinowitch and R. Belford, Pergamon Press New York, 1964). Since this photo redox reaction is a reversible one, in the absence of the light flux the initial concentrations will be eventually restored. However, if an extracting phase is present during the irradiation, providing for the removal of the $U^{+4}$ ions as they form, then a net diminution of uranium from its initial solution can be achieved.

The external phase of the emulsion is selected to be selectively permeable to the species, e.g., $U^{+6}$, dissolved in the aqueous solution. The solubility of various species in oil phases is known in the art, and means for increasing such solubility especially in liquid membrane processes are well known. For example, as taught in U.S. Pat. No. 3,779,907, various complexing agents for such species may be provided in the external phase of the emulsion to allow the species to permeate therethrough.

Thus, a water-in-oil emulsion containing an external phase suitable for separating the species from the aqueous solution is prepared. Methods for preparing water-in-oil emulsions are well known in the art. For example, a mixture of the oil and water may be agitated under severe conditions in the presence of a surfactant to form such emulsions. A surfactant is a molecule having an oil soluble portion and a water soluble portion whereby it orients at the interface of the water and oil phases of the emulsion to provide stabilization thereof. The surfactant will be selected from those suitable for stabilizing a particular water-in-oil emulsion by means well known in the art. Examples of such surfactants which may be used in stabilizing water-in-oil emulsions include: anionic, cationic, nonionic and ampholytic surfactants. These surfactants are described in the book, *Surface Active Agents and Detergents,* by Schwartz, Perry and Berch, Interscience Publishers, Inc., New York, NY., hereby incorporated by reference. Anionic surfactants include carboxylic acids, i.e. fatty acids, resin acids, tall oil acids, and acids from paraffin oxidation products, sulfuric esters, alkane sulfonates, alkylaryl sulfonates, mahongany and petroleum sulfonates, phosphates, and lignin derivatives.

The cationic surfactants include quaternary ammonium compounds, e.g., salts of long-chain primary alkyl amines including octadecylamine and dodecylamine. The secondary and tertiary amine salts and quaternary ammonium salts having from seven to forty carbons, are effective cationic surfactants.

Nonionic systems include the polyethenoxy surfactants, i.e. polyethoxy ethers of alkyl phenols, polyethoxy ethers of alcohols, polyethenoxy esters, etc. The polyethenoxy ethers are especially useful in the above invention as their solubility in the water and oil phase may be varied according to the weight of ethylene oxide added to the alkyl phenol starting material. Thus, stable emulsions can usually be obtained by utilizing these systems.

Ampholytic surfactants contain both an acidic and basic function in their structure and therefore will be cationic or anionic according to the pH of the solution in which they are dissolved. An example of this class of surfactants is dodecyl beta alanine.

The surfactant may comprise from 0.1 to 100 percent by weight of the external phase, i.e. the liquid membrane phase, of the emulsion; preferably from 0.1 to 5 percent.

Membrane strengthening additives can be added to increase the stability from rupture. Since it is critical that the liquid membrane (the external phase of the emulsion) remain intact, the addition of additives which will strengthen the membrane is particularly preferred. Additives such as polyethylene glycol, polyvinyl alcohol, cellulose derivative such as methylcellulose, etc. can be used within the scope of the instant invention.

The membrane strengthening additive which may function as a surfactant also may comprise from about 0.1 to 100 percent by weight of such membrane.

The choice of the components of the liquid membrane, i.e., complexing agent, surfactant, membrane strengthening additive, must be made with a view toward the permeation properties of the external phase of the emulsion to the desired species.

The external phase may also include any suitable oil. For example the following organic solvents may be used to form stable water in oil emulsions useful in the process of the instant invention: hydrocarbons; including parafins, olefins and aromatics; oxygenated hydrocarbons including water immiscible alcohols, ethers, ketones, aldehydes, etc.; chlorinated hydrocarbons; water immiscible amines; etc.

The solvent may be eliminated and replaced in its entirety by the surfactant or the membrane strengthening additive. Complexing agents suitable for complexing with the species to be removed from the aqueous solution must also be incorporated in the external phase of the emulsion.

Again certain complexing agents may function as surfactants and/or membrane strengthening additives as the terms are used above. The overlapping functions of the solvent, the surfactant, the complexing agent, and the membrane strengthening additive will not confuse one skilled in the art of preparing emulsions useful in liquid membrane processes since all these functions will be considered with the goal of providing an external emulsion phase which functions as an integral liquid membrane.

The external phase of the emulsion must be designed to allow the external electromagnetic field to contact the internal phase of the emulsion in most cases. Of course if heat is used to convert the impermeable species into its permeable state there is generally no difficulty since all well known emulsions will transmit heat. In this case, it is only necessary to ensure that the emulsion is stable to the temperature required to effect the above conversion. When light (or the absence of light) is necessary to effect such conversion then materials which absorb such light must be substantially eliminated from the external phase of the emulsion.

The aqueous internal phase of the emulsion contains a reagent which is suitable for reversibly converting the permeable species into an impermeable species. The reagent may be a catalyst which converts the permeable species into a nonpermeable state; it may precipitate said permeable species; it may be an oxidant or a reductant which converts such permeable species into a valence state in which it is not permeable, etc. Examples of the way such reagents may work in the instant process are found in U.S. Pat. No. 3,779,907 herein incorporated by reference in its entirety. It is to be noted that the reagent and the concentration thereof must be selected with an eye towards emulsion stability. One skilled in the art may select the correct reagent and concentration by means of a limited number of experiments. Moreover, the reagent must be selected so that the reconversion of the impermeable species back to a permeable form will be easily effected. This aspect of the invention is discussed further herein below.

As discussed above, in the commercially important liquid membrane processes, the permeable species must be converted into an impermeable species in order to be trapped in the internal phase of the emulsion. In the instant process, it is necessary to be able to convert such impermeable species back to a permeable species without breaking the emulsion. The choice of reagent is thus critical to the instant process for regenerating spent liquid membrane emulsions without breaking. Since the instant process is especially suitable for removing ions which are easily oxidized or reduced to various valence states, the most preferred reagent is an oxidation-reduction reagent which together with the ion form an oxidation-reduction couple which can be acted upon by heat or light. For example, $UO_2^{+2}$ wherein uranium exists in the $+6$ valence state may be converted to $U^{+4}$ by hydroquinone in the presence of light. In this reaction hydroquinone is converted to quinone. In the absence of light the reverse occurs, i.e. the quinone is converted to hydroquinone and the $U^{+4}$ is converted to the $+6$ (permeable) state.

The concept relies on the fact that the reduction of $UO_2^{+2}$ by hydroquinone is not a forward reaction in the absence of light: i.e. for the reaction

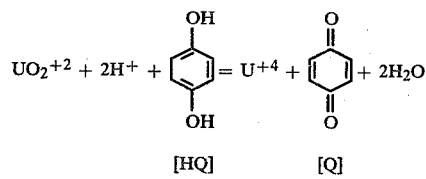

[HQ]        [Q]

The sum of the $UO_2^{+2}/U^{+4}$ half cell ($+0.6$ v) and the HQ/Q half cell ($-0.74$) is $-0.1$ v which means the equilibrium is normally to the left. Under illumination, however, it shifts to the right.

Thus it will be apparent that by agitating a spent emulsion, containing such $U^{+4}$ and quinone in the internal phase, with an aqueous solution, in the absence of light the uranium will permeate as $UO_2^{+2}$ from the internal phase into said aqueous solution and the quinone in internal phase will be converted to hydroquinone. Of course, the hydroquinone containing emulsion is suitable for reuse in separating $UO_2^{+2}$ from other aqueous solutions. The table below gives other liquid membrane separation processes in which multivalent ions may be reversibly removed from solutions by means of a reagent which together with such multivalent ions forms an oxidation-reduction couple that may be acted upon by heat or light.

| ION | COMPLEXING AGENT | |
|---|---|---|
| $Fe^{+3}$ | Acetylacetone | (Selective Over $Fe^{+2}$) |
| $Mn^{+3}$ | Acetylacetone | (Selective Over $Mn^{+2}$) |
| $Cr^{+2}$ | Acetylacetone | (Selective Over $Cr^{+3}$) |
| $Ce^{+4}$ | 8-hydroxyquinoline | (Selective Over $Ce^{+3}$) |
| $U^{+4}$ | Cupferron | (Selective over $U^{+6}$) |
| $V^{+5}$ | N-Benzoyl-n-phenyl Hydroxyamine | (Selective over $V^{+4}$) |
| $Sn^{+2}$ | Dithizone | (Selective over $Sn^{+4}$) |
| $Cr^{+6}$ | Diethyldithiocarbamate | (Selective over $Cr^{+3}$) |
| $Co^{+2}$ | Diethyldithiocarbamate | (Selective over $Co^{+3}$) |
| $Pu^{+4}$ | Tri-n-butylphosphate | (Selective over $Pu^{+6}$) |
| $Pu^{+4}$ | Tri-n-octylphosphine oxide | (Selective over $Pu^{+6}$ & $Pu^{+3}$) |
| $Cr^{+6}$ | High molecular weight amines | (Selective over $Cr^{+3}$) |

The water in oil emulsions used in the instant process may be formed by means known in the art such as agitators, homogenizers, etc.

The weight ratio of the external phase to the internal phase may vary from 10 to 1 to 1 to 10, preferably from 3 to 1 to 1 to 3. If a surfactant is added to the external phase it may be present in an amount from 0.001 to 100 weight percent, more preferably from about 0.01 to 10 weight percent of said external phase.

The above described emulsion will be contacted with an aqueous solution containing a species which is to be removed therefrom under conditions of mild agitation. For example the water-in-oil emulsion may be contacted with the aqueous solution on a batch basis wherein the emulsion and the aqueous solution are mixed together under conditions designed to disperse the emulsion, as droplets in the aqueous solution. Alternatively, the emulsion may be contacted with the aqueous solution in a column designed for counter-current extraction as is known in the art of liquid extraction processes. The contacting will take place under agitation and temperature conditions which are insufficient to break the emulsion and thereby destroy the integrity of the external phase. As is pointed out in the above patents, the external phase acts as a membrane and therefore rupture thereof defeats its function and allows the entire internal phase to mix with the aqueous solution. In general, temperatures above the freezing point of any of the components and below the boiling point of any of the components of the emulsion and the aqueous solution may be used. Higher temperatures, of course, will increase the rate of transfer through the external phase as in any membrane process. However, the stability of the emulsion may be adversely affected. In a limited number of experiments, one skilled in the art can determine the most suitable temperature for any given separation process. Temperatures of from 15° C. to 80° C. may be used in general with temperatures of from 25° C. to 50° C. most preferred.

As noted herein, the instant process may utilize foams i.e. wherein the internal phase is gaseous or an emulsion or foam may be contacted with a gaseous medium during the removal of the above species or the regeneration of the emulsion or foam used to separate such species. In this case the components of the emulsion (except for the external phase) may obviously be above their boiling point.

Similarly the pressure will be maintained so that the emulsion is stable. For economic reasons ambient pressures are generally used.

The time for contacting the emulsion with the aqueous solution will be selected in accordance with the nature of the particular emulsion and aqueous solution which is being contacted. Contact times of from 1 minute to 1 hour may be conveniently used in the instant process.

The emulsion being immiscible with the aqueous solution is easily separated therefrom. In the batch process, the emulsion may be separated merely by terminating the agitation. Depending on the relative specific gravity of the emulsion and the aqueous solution, the emulsion will separate at the bottom or the top of the batch reactor. The emulsion may then be conveniently removed by decanting.

The separated emulsion will be treated to convert the impermeable species of the internal phase into a permeable state. Such conversion will be carried out by means of an oxidation-reduction reaction which may be initiated by heat, light, etc. As noted above the regeneration of the emulsion, by conversion of the impermeable specie into a permeable specie, is carried out at conditions whereby the emulsion is not broken. For this reason, the heat required by the prior art regenerating process may be avoided by utilization of one of the preferred embodiments of the instant invention, i.e. light, or as described further below, isolating the impermeable species from light. The above conversion may be carried out at temperatures of from 1° to 99° C. while temperatures of from 25° to 75° C. are preferred for the aforesaid conversion. In general, the separated emulsion will be agitated with a fresh aqueous solution which can receive the permeable species from the aqueous solution described above. However, in the regeneration step, the permeation of the species will be from the internal phase of the emulsion into the fresh aqueous solution.

After a sufficient amount of permeable component has passed into the fresh aqueous solution, the agitation may be terminated and an emulsion which may be suitable for reuse in the above process may be recovered. The permeable species may be recovered as a solution in said fresh aqueous solution.

While the above process was described in terms of contacting a water in oil emulsion with an aqueous solution, it will be appreciated by one skilled in the art that oil-in-water emulsions can be used to remove permeable species from oil solutions. Furthermore, the fluid may be a gas which may be contacted with an emulsion.

Finally, the internal phase, while described above as a liquid, may also be gaseous in nature.

The above invention may be illustrated in terms of the specific examples given.

EXAMPLE I

Extraction and Recovery of $U^{+4}$ From a Solution

A solution containing low levels (about 100 ppm) of $U^{+4}$ (such as a phosphoric acid leachate) is first contacted with a liquid membrane emulsion whose external phase is composed of petroleum ether, surfactant and OPPA (octylphenyl phosphoric acid) which transports $U^{4+}$ but not $UO_2^{+2}$. The internal aqueous phase of the emulsion contains a water soluble quinone such as the sulfonated quinone shown below. The external phase of the emulsion acts as a agent to concentrate $UO_2^{+2}$ in the internal phase.

Step 1: (extraction)

Steps 2 and 3: (conversion of the permeable $U^{+4}$ to impermeable $UO_2^{+2}$ and reconversion of $UO_2^{+2}$ to $U^{+4}$)

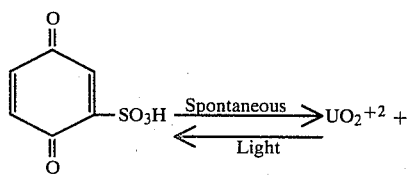

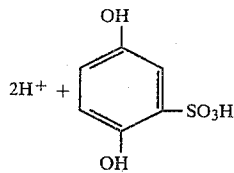

Thus, in the presence of light, the $U^{+4}$ species is regenerated and passes back through the membrane into the external (fresh) aqueous phase.

EXAMPLE II

$UO_2^{+2}$ Extraction and Recovery

In the first example it was demonstrated how $U^{+4}$ could be extracted, stripped and photoregenerated. By a similar process, a feed stream containing $UO_2^{+2}$ ($U^{+6}$) can be treated by (1) having a complexing agent in the liquid membrane which is selective for $UO_2^{+2}$ such as DEHPA-TOPO (diethyl hexyl phosphoric acid-trioctyl phosphine oxide) and (2) irradiating the emulsion during the extraction to achieve the stripping:

Step 1: (extraction)

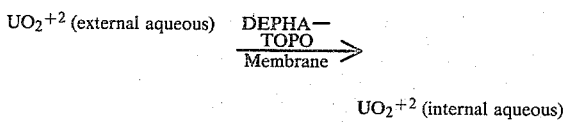

Step 2: (conversion of permeable $UO_2^{+2}$ to impermeable $U^{+4}$ and reconversion of $U^{+4}$ to $UO_2^{+2}$)

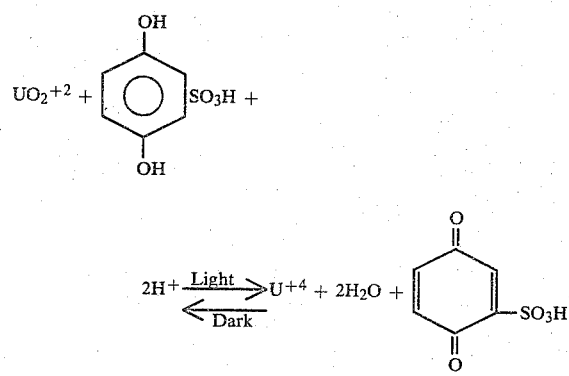

The irradiation is ceased and the emulsion is separated and contacted by agitating with an aqueous collecting (fresh) solution, wherein the emulsion is regenerated by $UO_2^{+2}$ permeating from the internal aqueous phase of the emulsion into such collecting solution.

EXAMPLE III

Winning of Uranium With Heat Cycling

A hot phosphoric acid solution (70° C.) containing low levels of $UO_2^{+2}$ (ca 100 ppm) is contacted with a liquid membrane emulsion composed of petroleum ether, surfactant and DEHPA-TOPO (See Example 2). The internal aqueous phase contains $Fe^{+2}/Fe^{+3}$ each at 0.1 M which acts as a reagent for converting $UO_2^{+2}$ to an impermeable species since at 70° C. the equilibrium below lies predominantly to the right:

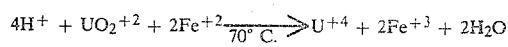

The uranium is recovered from the internal aqueous phase by separating the spent emulsion from the hot phosphoric acid solution and subsequently contacting said spent emulsion, as droplets, at a cooler temperature with a collecting (fresh) aqueous phase whereby the $UO_2^{+2}$ is reconverted to $U^{+4}$ and permeates into said collecting phase.

I claim

1. A process for removing a species from a fluid which comprises the steps of:
   (a) contacting said fluid with an emulsion, said emulsion having an external phase and an internal phase, said external phase being immiscible with said fluid and said species being permeable to said external phase;
   (b) permeating said species through said external phase into said internal phase;
   (c) converting said permeated species, in said internal phase, into a species which is impermeable to said external phase;
   (d) separating said emulsion from said fluid;
   (e) converting the impermeable species of step (c) by means of an oxidation-reduction reaction into a species which is permeable to said external phase; and
   (f) permeating the permeable species of step (e) through said external phase.

2. The process of claim 1 wherein said fluid is an aqueous solution and said emulsion is a water-in-oil emulsion having a water internal phase and an oil external phase.

3. The process of claim 2 wherein said separated emulsion of step (d) is contacted with an aqueous solution during the conversion step (e).

4. The process of claim 3 wherein said impermeable species is irradiated with light to convert such impermeable species into a species which is permeable to said external phase.

5. The process of claim 3 wherein said impermeable species is subjected to heat to convert such impermeable species into a species which is permeable to said external phase.

6. The process of claim 3 wherein said internal phase contains a reagent which is capable of converting said permeated species into an impermeable species.

7. The process of claim 6 wherein said reagent and said permeated species form a reversible oxidation-reduction couple.

8. The process of claim 7 wherein said permeated species is converted into an impermeable species by means of an oxidation-reduction reaction.

9. The process of claim 8 wherein said impermeable species is converted into a permeable species by reversing such oxidation-reduction reaction.

10. The process of claim 9 wherein said oxidation-reduction reaction is reversed by heating said oxidation-reduction couple.

11. The process of claim 9 wherein said oxidation-reduction reaction is reversed by irradiating said oxidation-reduction couple with light.

12. A process for removing a multivalent species from a solution containing said species in a first valence state which comprises the steps of:

(a) contacting said solution containing said species in a first valence state with an emulsion, said emulsion having an external phase which is permeable to said species when in the first valence state and impermeable to said species when said species is in a second valence state, said external phase surrounding an internal phase including a reagent which is capable of reversibly converting said species from said first valence state to said second valence state;

(b) permeating said species, in said first valence state, through said external phase;

(c) converting said permeated species by means of such reagent into said second valence state;

(d) separating said emulsion from said solution;

(e) converting said species from said second valence state to said first valence state; and (f) permeating said species of step (e) through said external phase.

13. The process of claim 12 wherein said multivalent species is a metal ion.

14. The process of claim 13 wherein said conversion of step (c) is carried out in the absence of light and said conversion of step (e) is effected by means of light.

15. The process of claim 13 wherein the conversion of step (c) is carried out in the presence of light and said conversion of step (e) is effected by the absence of light.

16. The process of claim 13 wherein the conversion of step (e) is effected by heating the impermeable species to a temperature above the temperature at which the conversion of step (c) occurs.

17. The process of claim 13 wherein the conversion of step (e) is effected by cooling the impermeable species to a temperature below the temperature at which the conversion of step (c) occurs.

18. The process of claim 13 wherein said metal ion is uranium.

19. The process of claim 18 wherein said first valence state is $+4$ and the second valence state is $+6$.

20. The process of claim 19 wherein said reagent is selected from the group consisting of $Fe^{+3}$, $I_2$, and quinone.

21. The process of claim 18 wherein said first valence state is $+6$ and the second valence state is $+4$.

22. The process of claim 18 wherein said reagent is selected from the group consisting of $Fe^{+2}$, $I^-$ and hydroquinone.

23. A process for removing metal ions having multiple valence states from an aqueous solution containing said metal ions in a first valence state which comprises the steps of:

(a) contacting said aqueous solution containing metal ions in a first valence state with an oil-in-water emulsion, said oil-in-water emulsion having an external oil phase which is permeable to said metal ion in said first valence state and impermeable to said metal ions when said metal ions are in a second valence state, said external oil phase surrounding an internal first aqueous phase including a reagent which is capable of reversibly converting said metal ion from said first valence state to said second valence state;

(b) permeating said metal ion in said first valence state through said external oil phase into said internal aqueous phase;

(c) converting said metal ion in said internal aqueous phase by means of such reagent into said second valence state;

(d) separating said emulsion from said aqueous solution;

(e) converting said metal ion in said internal aqueous phase from said second valence state to said first valence state; and (f) permeating said metal ion in said internal aqueous phase through said external oil phase into a second aqueous phase.

24. The process of claim 23 wherein said conversion of step (c) is carried out in the absence of light and said conversion of step (e) is effected by means of light.

25. The process of claim 23 wherein the conversion of step (c) is carried out in the presence of light and said conversion of step (e) is effected by the absence of light.

26. The process of claim 23 wherein the conversion of step (e) is effected by heating the impermeable species to a temperature above the temperature at which the conversion of step (c) occurs.

27. The process of claim 23 wherein the conversion of step (e) is effected by cooling the impermeable species to a temperature below the temperature at which the conversion of step (c) occurs.

28. A process for removing uranium ions from an aqueous solution containing said uranium ions in the $+4$ valence state which comprises the steps of:

(a) contacting said aqueous solution containing ionic uranium in the $+4$ valence state with an oil-in-water emulsion, said oil-in-water emulsion having an oil external phase which is permeable to ionic uranium in the $+4$ valence state and impermeable to ionic uranium ions when in a $+6$ valence state, said external oil phase surrounding an internal first aqueous phase including a reagent which is capable of reversibly converting ionic uranium from the $+4$ valence state to a $+6$ valence state, said reagent selected from the group consisting of $Fe^{+3}$, $I_2$ and quinone;

(b) permeating said ionic uranium in the $+4$ valence state, through said external oil phase, into said internal aqueous phase;

(c) converting said ionic uranium in said internal aqueous phase by means of such reagent into the $+6$ valence state;

(d) separating said emulsion from said aqueous solution;

(e) converting said ionic uranium from said $+6$ valence state to said $+4$ valence state; and (f) permeating said ionic uranium in said internal aqueous phase, through said external oil phase, into a second aqueous phase.

29. A process for removing ionic uranium having a valence of $+6$ from an aqueous solution which comprises the steps of:

(a) contacting said aqueous solution containing ionic uranium in a $+6$ valence state with an oil-in-water emulsion, said oil-in-water emulsion having an oil external phase which is permeable to said ionic uranium in the $+6$ valence state and impermeable to ionic uranium when in the $+4$ valence state, said oil external phase surrounding an aqueous internal phase including a reagent which is capable of reversibly converting said ionic uranium from the $+6$ valence state to the $+4$ valence state, said reagent selected from the group consisting of $Fe^{+2}$, $I^-$ and hydroquinone;

(b) permeating said ionic uranium in the $+6$ valence state, through said oil external phase, into said internal aqueous phase;

(c) converting said ionic uranium in said internal aqueous phase by means of such reagent into ionic uranium in the +4 valence state;
(d) separating said emulsion from said aqueous solution;
(e) converting said ionic uranium in the +4 valence state in the internal aqueous phase from said second valence state to the +6 valence state; and
(f) permeating said ionic uranium in the +6 valence state in the internal aqueous phase, through said oil external phase, into an aqueous external phase.

* * * * *